Patented Aug. 8, 1939

2,168,532

UNITED STATES PATENT OFFICE 2,168,532

PELLETING OF MATERIALS

Charles W. McMath and Logan Chester Roots, Jr., Fort Worth, Tex., assignors to Traders Oil Mill Company, Fort Worth, Tex., a corporation of Texas No Drawing. Application August 10, 1937, Serial No. 158,394

12 Claims. (Cl. 99—2)

This application relates to improvements in the pelleting of materials, especially feedstuffs and fertilizers.

Its object is to facilitate the operation of converting coarsely ground or pulverized materials into the form of pellets, reduce the power required for pelleting, reduce the wear and tear on the machinery with its accompanying repair expense, increase the capacity of extrusion machines, and to make a product having an improved glossy appearance and less tendency to crumble.

Many materials are formed into pellets by expression or extrusion through an orifice or a die under pressure. This procedure has been applied to cake screenings, to the meal derived from oil mill pressed cakes, especially cottonseed meal, to by-products of grains, and also to various fertilizer constituents, and to mixtures for feeding animals and for fertilizer use. In these procedures the meal or mixture is usually first heated and/or moistened if necessary and then pressed through dies having the desired size. Pellets are commonly made from one sixteenth inch diameter up to one inch diameter, or larger, and of any desired length, usually from one quarter inch to three inches. The cross section is usually circular but may be square or any other desired form.

One form of pelleting machine consists of a chamber having a bottom consisting of a strong steel plate with perforations of the desired size. Steel rollers rotate over this plate under heavy pressure. The material, in a slightly plastic condition, is put into this chamber and the rolls press same through the openings while the material extruding from the under side is cut off into pieces of the desired length. Other forms of extrusion apparatus may, of course, be used.

It is found in practice the pressures required for forcing material through the dies cause very severe wear and tear on the apparatus, thus causing a high expense for repairs.

We have found that the addition of a very small amount of the acetone insoluble matter obtainable from crude expressed vegetable oils to the material to be pelleted has a remarkable effect in improving the operation of the apparatus and in improving the appearance of the finished product.

Many crude expressed vegetable oils contain a small quantity of material which is insoluble in acetone, amounting to as much as one and one half per cent in some cases, the remainder of the oil being readily soluble in acetone. This insoluble material may be separated by treating the said crude expressed oil with several times its volume of acetone and allowing the insoluble matter to settle, or it may be separated by filtration, or otherwise. This same material largely separates out from the freshly pressed hot oil in cooling and settling for a considerable time, and may be recovered more completely and more quickly by first adding a small amount of water (usually about one quarter per cent to two per cent) to the said crude expressed oil; the water is absorbed by the acetone insoluble material contained in the oil which then separates from the oil very quickly. It may then be recovered by settling, filtration, or centrifuging. A certain amount of oil unavoidably adheres to the acetone insoluble matter when recovered in this way but this is harmless and does not need to be removed in carrying out our process. Crude cottonseed oil and crude soya bean oil are especially rich in this material and are desirable sources of supply.

The acetone insoluble material consists largely of substances variously known as phosphatides, lecithins, and lipoids, but is here designated collectively as the acetone insoluble material of the oil. It is harmless and possesses considerable food value.

The materials commonly used for pelleting and to which our improvement applies may consist of any material or mixture suitable for feeding to animals or for use as mixed fertilizer, which is moderately plastic or can be converted into plastic form by heat and moisture, such as the meal from any form of oil mill cake such as cottonseed meal, soya bean meal, peanut meal, copra meal, linseed meal, fish meal, also grain or grain by-products, spent brewer's grains, cottonseed hulls, meat scraps, fertilizing materials, together with such added ingredients as bone black, salt, calcium carbonate, and vitamin-containing oils, which materials may be used in mixtures, or in many cases separately. Cottonseed meal and other oil seed meals from which the oil has been removed by extraction processes may also be used in place of the corresponding meals produced by expression processes and grinding of the resulting cake. These pellets when of suitable composition are used for feeding to animals, and certain other compositions are used for fertilizer. In either case the shape and size are selected so as to be most suitable for the purpose intended.

The acetone insoluble material has considerable antioxidant power, so that it imparts a preservative action to mixtures containing oils subject to rancidity due to oxidation. Certain fish oils, such as cod liver oil for example, are often added to feeding mixtures because of their vitamin content, and in such cases the addition of the acetone-insoluble material exerts a very desirable antioxidant effect.

In carrying out our process we proceed as follows. The meal or mixture to be pelleted, for example the press cake resulting after expression of oil from cotton seed or from soya beans, is first ground and then put into a suitable vessel, preferably provided with a steam jacket, where it is heated usually to about 120° F., and a small amount of water, usually about two per cent, is added. Live steam may also be added to facilitate the heating and moistening of the mix. The object of this treatment is merely to bring the mass into a sufficiently plastic form to enable it to be extruded readily through the dies of the pelleting machine. A small quantity of the acetone insoluble material is added in the mixture, usually about one quarter of one per cent in amount, but the quantity added may range from one quarter per cent up to approximately five per cent. This material is preferably first thoroughly mixed with a portion of the mixture, or with one of the constituents of same, before being added to the complete mixture, as this assures a more complete and uniform distribution throughout the mass.

The material thus prepared is then extruded through the dies in the usual way. It is found that a mixture thus prepared with the acetone insoluble material passes through the dies with much greater ease and with much less pressure than the mixture without this added ingredient. We have found, for example, that the capacity of the apparatus is practically doubled while the power consumption is reduced to about one half and the life of the dies and of the rollers is practically doubled. The product itself has a smooth and somewhat glossy appearance, and the pellets retain their form without crumbling, all of which properties are much superior to those of a similar product not containing our added ingredient.

Our invention is not limited to the pelleting of meal derived from oil mill cakes, nor to any particular material, but covers the use of the acetone insoluble matter from crude expressed vegetable oils for facilitating pelleting processes in general.

We claim—

1. A process for converting a meal, plasticizable when moist and heated, into pellet form by extrusion, which includes the step of incorporating acetone insoluble matter derived from crude expressed vegetable oil in to the meal prior to extrusion.

2. A process for converting a meal, plasticizable when moist and heated, into pellet form by extrusion, which includes the step of incorporating from one quarter per cent to five per cent of acetone insoluble matter derived from crude expressed vegetable oil into the meal prior to extrusion.

3. A process for converting into pellet form a pulverized material suitable for feeding to animals, which comprises adding to said material a small quantity of the acetone insoluble matter derived from a crude expressed vegetable oil and extruding the mixture under pressure through an orifice.

4. A process for converting into pellet form pulverized mixed fertilizer material, which comprises adding to said material a small quantity of the acetone insoluble matter derived from a crude expressed vegetable oil and extruding the mixture under pressure through an orifice.

5. A process for converting into pellet form pulverized material comprising pulverized oil mill cake from which oil has been expressed, which comprises adding to said material a small quantity of the acetone insoluble matter derived from a crude expressed vegetable oil and extruding the mixture under pressure through an orifice.

6. A process for converting into pellet form pulverized material comprising pulverized oil mill cake from which oil has been expressed, which comprises adding to said material from one quarter per cent to five per cent of acetone insoluble material derived from a crude expressed vegetable oil, adding sufficient water and heating sufficiently to make the material plastic, and extruding same under pressure through an orifice.

7. A process for converting into pellet form pulverized material comprising pulverized oil mill cake from which oil has been expressed, which comprises adding to said material from one quarter per cent to five per cent of acetone insoluble matter derived from crude expressed cottonseed oil, adding sufficient water and heating sufficiently to make the material plastic, and extruding same under pressure through an orifice.

8. A process for converting into pellet form pulverized material comprising pulverized oil mill cake from which oil has been expressed, which comprises adding to said material from one quarter per cent to five per cent of acetone insoluble matter derived from crude expressed soya bean oil, adding sufficient water and heating sufficiently to make the material plastic, and extruding same under pressure through an orifice.

9. A process for converting pulverized material consisting predominantly of cottonseed meal into pellet form, which comprises mixing with said material from one quarter per cent to five per cent of the acetone insoluble matter derived from cottonseed oil, heating to approximately 120° F. with addition of sufficient water to convert the mixture into a plastic form, and extruding said mixture under pressure through an orifice.

10. A process for converting pulverized material consisting predominantly of soya bean meal into pellet form, which comprises mixing with said material from one quarter per cent to five per cent of the acetone insoluble matter derived from cottonseed oil, heating to approximately 120° F. with addition of sufficient water to convert the mixture into a plastic form, and extruding said mixture under pressure through an orifice.

11. A process for converting pulverized material consisting predominantly of cottonseed meal into pellet form, which comprises mixing with said material from one quarter per cent to five per cent of the acetone insoluble matter derived from soya bean oil, heating to approximately 120° F. with addition of sufficient water to convert the mixture into a plastic form, and extruding said mixture under pressure through an orifice.

12. A process for converting pulverized material consisting predominantly of soya bean meal into pellet form, which comprises mixing with said material from one quarter per cent to five per cent of the acetone insoluble matter derived from soya bean oil, heating to approximately 120° F., with addition of sufficient water to convert the mixture into a plastic form, and extruding said mixture under pressure through an orifice.

CHARLES W. McMATH.
LOGAN CHESTER ROOTS, Jr.